3,065,256
PHOSPHORUS ESTER DERIVATIVES OF VINYL SULFIDE AND A PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed July 13, 1959, Ser. No. 826,452
Claims priority, application Germany July 26, 1958
12 Claims. (Cl. 260—461)

The present invention relates to and has as its objects new and useful derivatives of vinyl sulfide and a process for their production. Generally the new compounds of the present invention may be represented by the following formula

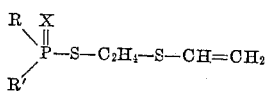

in which R and R' stand for lower alkoxy, lower alkyl or lower alkenyl radicals, X stands for oxygen or sulfur.

Vinyl-mercapto-alkyl-thiol- or thionothiolphosphoric acid esters, -phosphonic acid esters and -phosphinic acid esters are hitherto unknown in the literature. They became obtainable after a simple process for the production of divinyl sulfide has been found. This process for the production of divinyl sulfide from di-β-chloroethyl sulfide will also be described within the present application.

The addition of 1 mol of the aforesaid divinyl sulfide leading to the corresponding phosphorus derivative mentioned above can be effected to all thiophosphoric acid, -phosphonic acid or -phosphinic acid compounds which contain the grouping

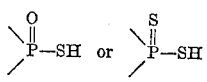

As an example, the reaction with 0.0-diethyl-dithiophosphoric acid ester may be illustrated by the following formula scheme:

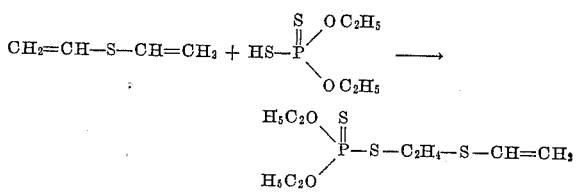

As a rule, the addition of the divinyl sulfide on phosphoric acid compounds of the above general constitution takes place within an exothermic reaction. The reaction is preferably carried out in suitable inert solvents or diluents such as benzene, toluene, acetone or methylethyl ketone and the like.

The starting vinyl-thioethers of the general formula

wherein R stands for a second vinyl group and more generally such ethers containing also as R a low molecular weight alkyl radical, have been described in the literature as compounds which are difficult to obtain. The following processes for the production of such vinyl ethers are hitherto known in the literature.

Reaction of vinyl bromide with ethyl-mercaptan sodium salt:

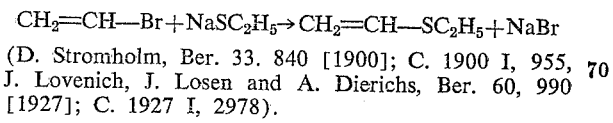

(D. Stromholm, Ber. 33. 840 [1900]; C. 1900 I, 955, J. Lovenich, J. Losen and A. Dierichs, Ber. 60, 990 [1927]; C. 1927 I, 2978).

Dehydrating of β-hydroxy-diethyl sulfide:

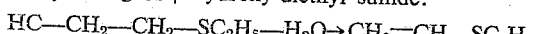

(United States Patent No. 2,402,878 [1946]; C. 1947, 380). Reaction of acetylene with ethyl-mercaptan:

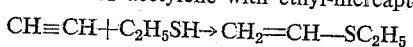

(German Patent No. 617,543; C. 1936 I, 642. A. Je. Favorski & M. F. Schostakowski, J. Chem. (Russian) 13, 1 [1943]; C. A. 38, 330).

Splitting off of hydrogen chloride from α-chloro-thioethyl ether:

(a) 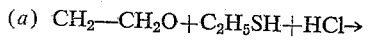

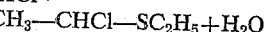

(b) $CH_3-CHCl-SC_2H_5-HCl \rightarrow CH_2=CH-SC_2H_5$ (H. Böhme: German Patent No. 869,064; H. Böhme, H. Fischer and R. Frank, Ann. 563, 54 [1949].

The preparation of divinyl thioether by splitting off hydrochloric acid from β.β'-dichloro-diethyl-sulfide according to the following equation

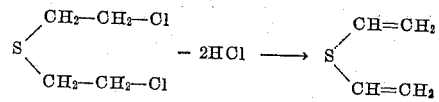

has been described in the literature by B. Helferich, J. Am. Chem. Soc. 42, 1225 (1920). The yields of the desired divinyl compound are also unsatisfactory according to this reference.

It has now been found that vinyl thioethers may be obtained in an excellent yield and high purity by introducing at boiling temperature β-chloro-ethyl-thio-ether of the general formula

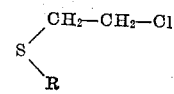

wherein R stands for a low molecular weight alkyl radical or for a further β-chloroethyl group, into an alcoholic potassium hydroxide and by removing instantaneously the vinyl thioether formed from the reaction mixture by distillation. It has been found advantageous to increase the temperature of the reaction mixture by the addition of high boiling water-soluble alcohols such as glycol, glycerol, penta-erythritol or their partial ethers, especially the glycol-monomethyl ether.

The new compounds of the present invention are very effective pest control agents with a strong insecticidal action, especially against flies, aphids and spider mites. They have, moreover, an outstanding systemic activity.

As an example for the special utility of the inventive compounds the esters of the following formulae (I) 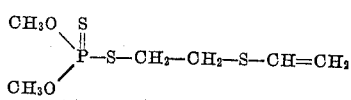

(II) 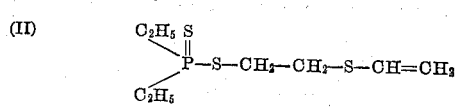

(III) 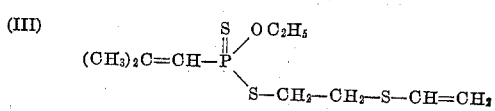

have been tested against aphids and spider mites. Aqueous solutions of the aforesaid compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out in the following manner:

(a) Against aphids (species *Doralis fabae*). Heavily infested bean plants (*Vitia faba*) have been sprayed drip wet with 0.1% solutions as prepared above. The effect has been determined by evaluation after 24 hours by counting the dead pests either on the surface of the soil or still remaining on the plants; 100% killing was obtained;

(b) Against spider mites (contact-insecticidal action). Bean plants (*Phaseolus vulgaris*) of about 15 inches height have been sprayed drip wet with 0.01% solutions as prepared above. The bean plants have been infested heavily with the two-spotted spider (species *Tetranychus telarius*). Evaluation has been carried out after 24 hours, 48 hours and 8 days. The total percentage of killed pests after 8 days was 80% (with Compound I) and 100% respectively (with Compounds II and III).

The following examples are given for the purpose of illustrating the process according to the present invention.

*Example 1*

120 grams of potassium hydroxide are dissolved in 180 cc. of anhydrous ethyl alcohol. 20 cc. of water and 100 cc. of glycol-monomethyl ether are added. At an internal temperature of 105–110° C. 160 grams of β,β'-dichloro-diethyl sulfide are then added dropwise within 10 minutes. The divinyl sulfide formed is distilled off. The distillate is then introduced into water. The divinyl sulfide which separates as an oil, is separated and washed twice with 100 cc. of water each time. After drying over sodium sulfate 40 grams of divinyl sulfide of a B.P. of 92–93° C./760 mm. Hg are obtained. Yield 47% of the theoretical.

*Example 2*

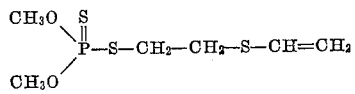

22 grams (0.25 mol) of divinyl sulfide are dissolved in 100 cc. of benzene. 40 grams (0.25 mol) of dimethyl-thionothiolphosphoric acid are added with stirring. The temperature of the reaction product spontaneously rises to about 60° C. Stirring is continued at 60° C. for a further hour and the mixture is then introduced into water and the benzene layer separated. The benzene solution is washed neutral, dried and subsequently fractionated. 24 grams of the new ester of a B.P. of 90° C./0.01 mm. Hg are thus obtained. Yield 40% of the theoretical. On rats per os the new ester shows a mean toxicity of 250 mg./kg.

*Example 3*

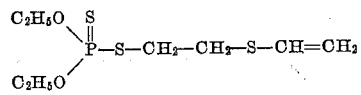

22 grams (0.25 mol) of divinyl sulfide are dissolved in 50 cc. of benzene. 47 grams (0.25 mol) of diethyl-thionothiol-phosphoric acid are added with stirring. The product is heated to 70° C. for a further hour and then worked up as described in Example 2. 32 grams of the new ester of a B.P. of 90° C./0.02 mm. Hg are obtained. Yield 47% of the theoretical.

Aphids and spider mites are killed completely with 0.1% solutions. Systemic action on aphids 0.1% 100%.

*Example 4*

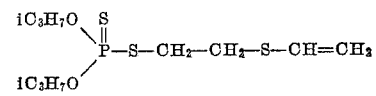

34.4 grams (0.4 mol) of divinyl sulfide are dissolved in 200 cc. of benzene. 86 grams (0.4 mol) of diisopropyl-dithiophosphoric acid are added with stirring and the mixture is heated to 70° C. for a further hour. After working up in conventional manner, 50 grams of the new ester of a B.P. of 110° C./0.01 mm. Hg are obtained. Yield 40% of the theoretical. On rats per os LD₅₀ 100 mg./kg. Spider mites are killed completely with 0.1% solutions.

*Example 5*

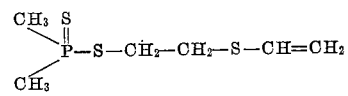

22 grams (0.25 mol) of divinyl sulfide are mixed with 32 grams (0.25 mol) of dimethyl-thionothiol-phosphinic acid. The temperature rapidly rises to 115° C. The temperature is kept at 100° C. for a further hour and the product is worked up in conventional manner. 34 grams of the new ester of a B.P. of 76° C./0.01 mm. Hg are obtained. Yield 64% of the theoretical.

Aphids and spider mites were killed completely with 0.1% solutions. Systemic action on aphids 0.1% 100%.

*Example 6*

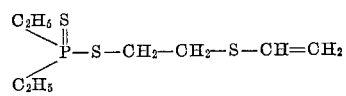

22 grams (0.25 mol) of divinyl sulfide are dissolved in 100 cc. of benzene. 39 grams (0.25 mol) of diethylthionothiolphosphinic acid are added with stirring. The temperature rises to 60° C. The mixture is kept at 70° C. for a further hour and then worked up in conventional manner. 30 grams of the new ester of a B.P. of 92° C./0.01 mm. Hg are obtained. Yield 50% of the theoretical.

*Example 7*

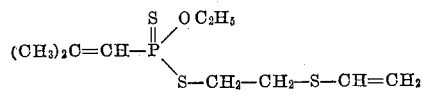

49 grams (0.25 mol) of isobutyl-thiono-thiolphosphonic acid are dissolved with 22 grams (0.25 mol) of divinyl sulfide in 50 cc. of benzene. The mixture is kept at 70° C. for one hour and then worked up in conventional manner. 54 grams of a yellowish water-insoluble oil, which is not distillable even in a high vacuum, is obtained. Yield 77% of the theoretical.

*Example 8*

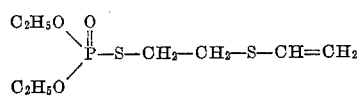

43 grams (0.25 mol) of diethyl-thiolphosphoric acid are mixed with 22 grams (0.25 mol) of divinyl sulfide. The temperature rises to 65° C. The mixture is kept at 70° C. for 2 hours and then worked up in conventional manner. 32 grams of the new ester of a B.P. of 86° C./0.01 mm. Hg are thus obtained. Yield 50% of the theoretical.

*Example 9*

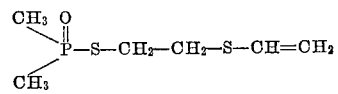

22 grams (0.25 mol) of divinyl sulfide are mixed with 28 grams (0.25 mol) of dimethyl-thiolphosphinic acid. The temperature rises to 40° C. The reaction product is kept at 70° C. for a further 3 hours with stirring. After working up in conventional manner, 30 grams of the new ester of a B.P. of 84° C./0.01 mm. Hg are obtained. Yield 61% of the theoretical.

Aphids and spider mites are killed completely with 0.1% solutions. Systemic action on aphids 0.1% 100%.

Example 10

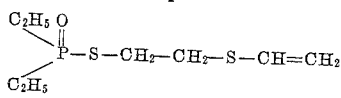

22 grams (0.25 mol) of divinyl sulfide are mixed with 35 grams (0.25 mol) of diethyl-thiolphosphinic acid. The mixture is kept at 70° C. for 3 hours and then worked up in conventional manner. 27 grams of the new ester are obtained as a colorless, water-insoluble oil of a B.P. of 88° C./0.01 mm. Hg. Yield 44% of the theoretical.

Aphids and spider mites are killed completely with 0.1% solutions. Systemic action on aphids 0.1% 100%.

I claim:

1. A compound of the following general formula

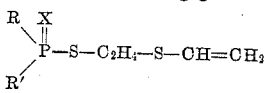

in which both R and R' stand for a member selected from the group consisting of lower alkyl, lower alkenyl and lower alkoxy groups, and X stands for a member selected from the group consisting of oxygen and sulfur.

2. A compound of the following formula

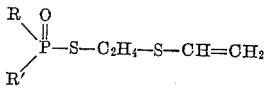

in which both R and R' stand for a member selected from the group consisting of lower alkyl, lower alkenyl and lower alkoxy groups.

3. A compound of the following formula

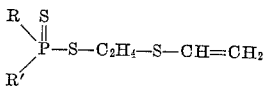

in which both R and R' stand for a member selected from the group consisting of lower alkyl, lower alkenyl, and lower alkoxy groups.

4. The compound of the following formula

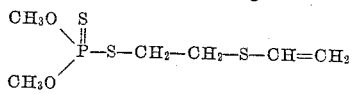

5. The compound of the following formula

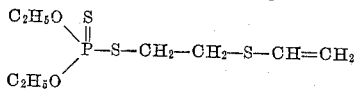

6. The compound of the following formula

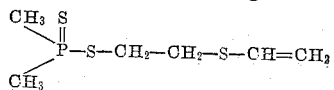

7. The compound of the following formula

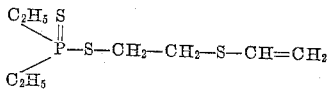

8. The compound of the following formula

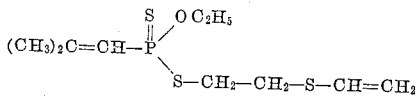

9. The compound of the following formula

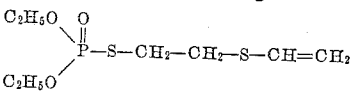

10. The compound of the following formula

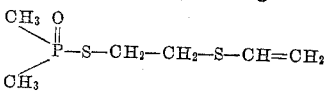

11. The compound of the following formula

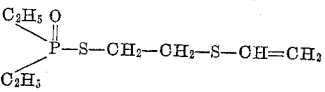

12. The compound of the following formula

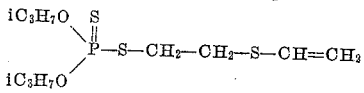

References Cited in the file of this patent

UNITED STATES PATENTS

| | | |
|---|---|---|
| 2,571,989 | Schrader | Oct. 16, 1951 |
| 2,586,655 | Hook et al. | Feb. 19, 1952 |
| 2,597,534 | Schrader | May 20, 1952 |
| 2,806,884 | Tapp | Sept. 17, 1957 |
| 2,908,717 | Johnston | Oct. 13, 1959 |
| 2,914,568 | Goheen et al. | Nov. 24, 1959 |
| 2,960,523 | O'Brien | Nov. 15, 1960 |

FOREIGN PATENTS

| | | |
|---|---|---|
| 1,103,577 | France | May 25, 1955 |
| 1,113,363 | France | Dec. 5, 1955 |

OTHER REFERENCES

Mastryukov et al.: "Bull. Acad. Sci. USSR., Div. Chem. Sci." (1956) pp. 433–440.